(12) United States Patent
Priyanto et al.

(10) Patent No.: US 11,044,720 B2
(45) Date of Patent: *Jun. 22, 2021

(54) BEAM SWEEP CONFIGURATION

(71) Applicant: Sony Corporation, Tokyo (JP)

(72) Inventors: Basuki Priyanto, Lund (SE); Erik Bengtsson, Eslöv (SE); Olof Zander, Södra (SE); Thomas Bolin, Lund (SE); Zhinong Ying, Lund (SE); Bo Larsson, Malmö (SE)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,850

(22) Filed: Aug. 31, 2020

(65) Prior Publication Data

US 2020/0413378 A1 Dec. 31, 2020

Related U.S. Application Data

(63) Continuation of application No. 16/476,021, filed as application No. PCT/EP2018/050259 on Jan. 5, 2018, now Pat. No. 10,805,920.

(30) Foreign Application Priority Data

| Jan. 9, 2017 | (EP) | ................................ | 17150723 |
| Feb. 3, 2017 | (EP) | ................................ | 17154645 |
| Jun. 16, 2017 | (EP) | ................................ | 17176443 |

(51) Int. Cl.
| H04L 5/00 | (2006.01) |
| H04B 7/06 | (2006.01) |
| H04W 72/04 | (2009.01) |
| H04W 8/22 | (2009.01) |
| H04W 16/28 | (2009.01) |
| H04B 7/08 | (2006.01) |

(52) U.S. Cl.
CPC ........ *H04W 72/042* (2013.01); *H04B 7/0695* (2013.01); *H04B 7/088* (2013.01); *H04L 5/0048* (2013.01); *H04W 8/22* (2013.01); *H04W 16/28* (2013.01); *H04W 72/044* (2013.01); *H04W 72/0453* (2013.01)

(58) Field of Classification Search
CPC .... H04L 5/0048; H04W 72/042; H04W 8/22; H04W 16/28; H04B 7/088; H04B 7/0695
USPC ....................................................... 375/267
See application file for complete search history.

(56) References Cited

U.S. PATENT DOCUMENTS

| 2011/0065448 A1 | 3/2011 | Song et al. |
| 2013/0272263 A1 | 10/2013 | Pi et al. |

(Continued)

FOREIGN PATENT DOCUMENTS

WO  2018080660 A1  5/2018

OTHER PUBLICATIONS

International Search Report and Written Opinion from corresponding International Patent Application No. PCT/EP2018/050259, dated Apr. 16, 2018; 12 pages.

*Primary Examiner* — Ted M Wang
(74) *Attorney, Agent, or Firm* — Tucker Ellis LLP

(57) ABSTRACT

A beam sweep configuration of at least one beam sweep is exchanged between nodes of a network. The beam sweep configuration may be indicative of a time-duplex configuration of a plurality of beams of the at least one beam sweep. A beam configuration may be determined based on a receive property of pilot signals transmitted and/or received in the beam sweep.

23 Claims, 14 Drawing Sheets

(56) References Cited

U.S. PATENT DOCUMENTS

2013/0301454 A1    11/2013  Seol et al.
2016/0021548 A1    1/2016  Raghavan et al.
2018/0115990 A1*  4/2018  Abedini ................ H04W 76/10
2019/0053013 A1*  2/2019  Markhovsky ............. G01S 5/06

* cited by examiner

FIG. 8
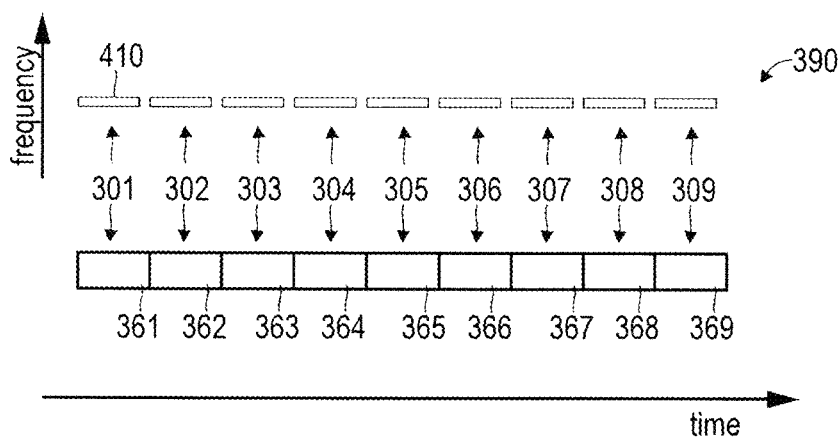
FIG. 9
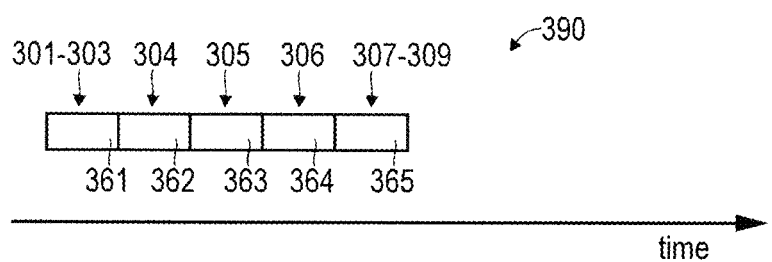
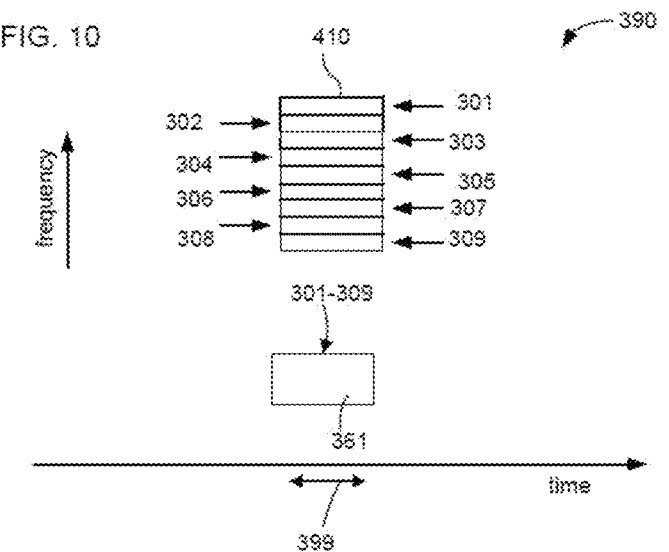
FIG. 10

BEAM SWEEP CONFIGURATION

CROSS-REFERENCE TO RELATED APPLICATIONS

This continuation application claims priority to and the benefit of U.S. application Ser. No. 16/476,021 filed on Jul. 3, 2019. U.S. application Ser. No. 16/476,021 is a national phase application of International Application No. PCT/EP2018/050259 filed Jan. 5, 2018 and published in the English language. The entireties of the aforementioned applications are incorporated herein by reference.

TECHNICAL FIELD

Various examples of the invention generally relate to determining a beam configuration of a beam used for transmission of data by an interface of a node of a network. Various examples of the invention specifically relate to determining the beam configuration based on a receive property of pilot signals transmitted and/or received in a plurality of beams of at least one beam sweep that is configuration in accordance with a beam sweep configuration.

BACKGROUND

Beamforming techniques are becoming increasingly popular for wireless transmission. One advantage of beamforming is the compatibility with transmission on high carrier frequencies, e.g., above 6 GHz and even up to 60 GHz or beyond. Large bandwidths may be achieved. Another advantage of beamforming is the availability of spatial multiplexing, thereby increasing spectral efficiency.

Various applications of beamforming are envisioned in the Third Generation Partnership Project (3GPP) New Radio (NR) or 5G communication system.

Different hardware architectures for interfaces of devices—such as terminals (UEs) and base stations (BSs)—which support beamforming are conceivable. Depending on the hardware architectures, it is expected that the capabilities with respect to beamforming vary.

For synchronizing the beam configuration between transmitting node and receiving node, typically one or more beam sweeps are employed. Here, pilot signals are transmitted and/or received in a plurality of beams defined by the beam sweep. Based on a receive property of the pilot signals, it is then possible to determine the beam configuration for subsequent transmission of data.

Existing techniques of beam sweeps typically ensure interoperability between different devices by conservative dimensioning of the beam sweep parameters. A certain headroom may be provided in order to ensure interoperability even for devices with low-end specifications. This, however, can limit the available benefits in terms bandwidth and/or spectral efficiency. The latency may be increased.

SUMMARY

Therefore, a need exists for advanced techniques of beamforming. In particular, a need exists for such techniques which overcome or mitigate at least some of the above-identified drawbacks and restrictions.

This need is met by the features of the independent claims. The dependent claims define embodiments.

A node of a network includes an interface for transmission on a wireless link of the network. The node further includes a control circuit. The control circuit is configured to determine a beam configuration of a beam used for transmission of data by the interface. For determining the beam configuration, the control circuit is configured to exchange, with a further node of the network, a beam sweep configuration. For determining the beam configuration, the control circuit is further configured to control the interface to transmit and/or receive pilot signals in a plurality of beams of at least one beam sweep which is configured in accordance with the beam sweep configuration. For determining the beam configuration, the control circuit is further configured to determine the beam configuration based on a receive property of the pilot signals.

A method of a node of a network determining a beam configuration of a beam used for transmission of data on a wireless link of the network includes exchanging, with a further node of the network, a beam sweep configuration. The method further includes transmitting and/or receiving pilot signals in a plurality of beams of at least one beam sweep which is configured in accordance with the beam sweep configuration. The method further includes determining the beam configuration based on a receive property of the pilot signals.

A computer program product includes program code that may be executed by at least one processor. Executing the program code causes the at least one processor to perform a method of a node of a network determining a beam configuration of a beam used for transmission of data on a wireless link of the network includes exchanging, with a further node of the network, a beam sweep configuration. The method further includes transmitting and/or receiving pilot signals in a plurality of beams of at least one beam sweep which is configured in accordance with the beam sweep configuration. The method further includes determining the beam configuration based on a receive property of the pilot signals.

A computer program includes program code that may be executed by at least one processor. Executing the program code causes the at least one processor to perform a method of a node of a network determining a beam configuration of a beam used for transmission of data on a wireless link of the network includes exchanging, with a further node of the network, a beam sweep configuration. The method further includes transmitting and/or receiving pilot signals in a plurality of beams of at least one beam sweep which is configured in accordance with the beam sweep configuration. The method further includes determining the beam configuration based on a receive property of the pilot signals.

A system includes a node of a network and a further node of the network. The node and the further node are configured to exchange a beam sweep configuration. The node is configured to transmit pilot signals in a plurality of beams of at least one beam sweep. The at least one beam sweep is configured in accordance with the beam sweep configuration. The further node is configured to receive the pilot signals in a plurality of beams of at least one further beam sweep. The at least one further beam sweep is configured in accordance with the beam sweep configuration. The system is configured to determine the beam configuration based on a receive property of the pilot signals.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 8 schematically illustrates a time-duplex configuration of a beam sweep according to various examples.

FIG. 9 schematically illustrates a time-duplex configuration of a beam sweep according to various examples.

FIG. 10 schematically illustrates a time-duplex configuration of a beam sweep according to various examples.

DETAILED DESCRIPTION OF EMBODIMENTS

Figure 1:
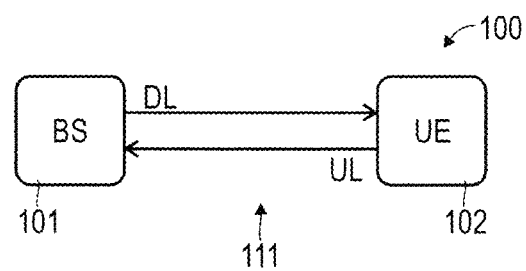
FIG. 1 schematically illustrates a network comprising a wireless link between a base station and a UE according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication in a network are disclosed. For example, the network may be a cellular network comprising multiple cells, wherein each cell is defined by one or more BSs. Example network architectures include the 3GPP LTE architecture. According to 3GPP LTE, a wireless channel is defined according to the evolved UMTS Terrestrial Radio Access (EUTRAN). Similar techniques can be readily applied to various kinds of 3GPP-specified architectures, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. In particular, such techniques may be applied in 3GPP NB-IoT or eMTC networks and 3GPP New Radio (NR) networks. Furthermore, respective techniques may be readily applied to various kinds of non-3GPP-specified architectures, such as Bluetooth, satellite communication, IEEE 802.11x Wi-Fi technology, etc.

The techniques described herein may facilitate determining a beam configuration of a beam used for transmission of data—e.g., payload data or control data such as Layer 2 or Layer 3 control data—by an interface of a network node. As such, the techniques described herein may generally facilitate efficient beamforming. Facilitating beamforming may, in turn, facilitate spatial multiplexing and high bandwidths, e.g., above 6 GHz or 10 GHz or even above 50 GHz.

The beam configuration may be indicative of phase shifts and/or gain settings and/or other precoding properties for each one of a plurality of antenna ports of the interface. Respective antenna signals can be processed accordingly.

By using a certain beam configuration, a well-defined spatial profile of the wireless transmission via the plurality of antenna ports may be obtained, typically referred to as a beam. The beam may thus define a directivity of transmitting and/or receiving. The spatial profile may define a certain width and amplitude of the beam. The spatial profile may define side lobes which may be suppressed if compared to a central peak of the beam. The spatial profile may be associated with a propagation channel of the respective signals; here, the propagation channel may include one or more reflections, etc.

According to examples, the beam configuration is determined based on one or more beam sweeps. A beam sweep may include a plurality of beams, wherein signals—e.g., pilot signals having a predefined amplitude and signal form—are transmitted and received on each one of the plurality of beams. By comparing receive properties of the signals for the plurality of beams, one or more beams may be selected from the plurality of beams which have preferable transmission characteristics. Then, the beam configuration may be determined in accordance with the selected one or more beams. Example receive properties that can be taken into account when determining the beam configuration of the data transmission include: signal power level (SINR); signal-to-noise ratio; path loss; and fading.

Sometimes, such a determination of the beam configuration for the transmission of data using a beam sweep is referred to as pilot beam alignment. This is because the beam configuration may be implemented at the receiver, as well as at the transmitter of the data transmission. In this regard, a transmit beam configuration and a receive beam configuration may be defined. Here, the transmit beam may be synchronized in space with the receive beam for both uplink (UL) and downlink (DL) transmission, i.e., relating to an UL beam configuration and a DL beam configuration, respectively. The beam configuration may generally include a set of parameters. The parameters may be indicative of the various configuration properties of the respective beam.

Generally, different beam configurations may be used for data transmitted in different frequencies. For example, this may result in using a different beam configuration for uplink (UL) data transmitted from a UE—implementing the transmitter—to a BS—implementing the receiver—if compared to downlink (DL) data transmitted from the BS to the UE.

Sometimes, it may be possible to determine the UL beam configuration based on the DL beam configuration, or vice versa. This may apply if reciprocity of the transmission is provided for, e.g., because, both, UL transmission and DL transmission employ resources situated in the same frequency band. Reciprocity may relate to a scenario where the angle of arrival and angle of departure are the same for a given beam, so that transmit beam configuration may directly relate to a receive beam configuration defining the same beam. Such a scenario of frequency re-use between UL transmission and DL transmission may occur for time division duplex (TDD) transmission protocols. Limited or no reciprocity of the transmission may be given for frequency division duplex (FDD) transmission protocols where UL transmission and DL transmission employ resources situated in different frequency bands.

Pilot beam alignment by means of one or more beam sweeps may, consequently, include a beam sweep of UL pilot signals and/or a beam sweep of DL pilot signals. Furthermore, pilot beam alignment by means of one or more beam sweeps may, consequently, include a transmit beam sweep and/or a receive beam sweep. This may result in many different configurations being available for the beams sweeps.

To account for this complexity of the pilot beam alignment, according to various examples, a beam sweep configuration is exchanged between a first node of a network and the second node of a network. For example, an UL beam sweep configuration and/or a DL beam sweep configuration may be exchanged. The UL beam sweep configuration may generally be different from the DL beam sweep configuration. Then, an interface of the first node is controlled to transmit and/or receive pilot signals in a plurality of beams of at least one beam sweep which is configured in accordance with the beam sweep configuration. It is then possible to determine the beam configuration based on a receive property of the pilot signals.

By exchanging the beam sweep configuration, the one or more beam sweeps may be tailored to the needs and/or capabilities of the first node and the second node. This may reduce latency and/or may reduce energy consumption.

For example, hardware capabilities may limit a time-duplex configuration of the beam sweep of at least one of the first node and the second node to some larger or smaller degree. Here, the time-duplex configuration may generally relate to a capability of the respective interface to transmit and/or receive a plurality of beams contemporaneously.

By exchanging the beam sweep configuration, it may be possible to find an optimized configuration of the one or more beam sweeps in view of such limitations of the hardware capabilities. In particular, it may not be required to provision any predefined headroom in the configuration of the one or more beam sweeps to account for potentially limited hardware capabilities of a-priori unknown nodes. Rather, the beam sweeps may be configured on a node-by-node basis taking into account the actual capabilities.

Such techniques are based on the general finding that operation of wireless transmission in the millimeter-wave frequency bands is attractive, because the available bandwidth is vast. To address challenges in terms of limited antenna aperture, the techniques described herein enable to tailor the beam configuration. For example, the wide bandwidth can be challenging, because the analog-to-digital converter or digital-to-analog converter sampling rates may be required to reside in the GHz regime. This can result in significant current consumption when operating the converters. Current consumption may be critical for mobile or handheld nodes such as a UE. Therefore, according to various examples, by exchanging the beam sweep configuration, the beam sweep configuration for the transmission of the data may be determined taking into account an energy consumption associated with the beam sweep. Alternatively or additionally, it may also be possible to take into account a latency requirement of the transmission of the data when determining the beam sweep configuration. The latency requirement may define a threshold duration available for successful transmission of the data. For example, in a factory, low latency transmission may be more important than reduced energy consumption. Differently, in rural areas, low latency transmission may be less important than reduced energy consumption. For example, a balance between low-latency transmission of the data on the one hand side and low-energy consumption of the beam sweep on the other hand side may be addressed by appropriately setting the time-duplex configuration of the plurality of beams of each beam sweep.

FIG. 1 schematically illustrates a wireless communication network 100 that may benefit from the techniques disclosed herein. The network may be a 3GPP-standardized network such as 3G, 4G, or upcoming 5G NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. A wireless link 111 is established between the BS 101 and the UE 102. The wireless link 111 includes a DL link from the BS 101 to the UE 102; and further includes an UL link from the UE 102 to the BS 101. Time-division duplexing (TDD), frequency-division duplexing (FDD), and/or code-division duplexing (CDD) may be employed for mitigating interference between UL and DL. Likewise, TDD, FDD, and/or CDD may be employed for mitigating interference between multiple UEs communicating on the wireless link 111 (not shown in FIG. 1).

The UE 102 may be one of the following: a smartphone; a cellular phone; a table; a notebook; a computer; a smart TV; an MTC device; an eMTC device; an IoT device; an NB-IoT device; a sensor; an actuator; etc.

Figure 2:
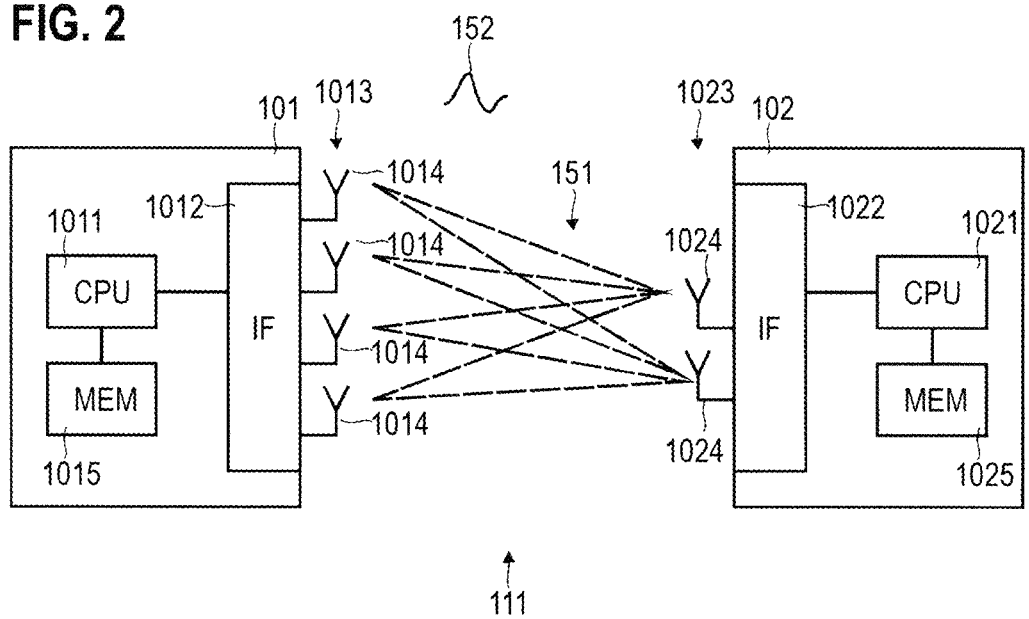
FIG. 2 schematically illustrates the base station, the UE, and the wireless link of the network in greater detail according to various examples.

FIG. 2 schematically illustrates the BS 101 and the UE 102 in greater detail. The BS 101 includes a processor 1011 and an interface 1012, sometimes also referred to as frontend. The interface 1012 is coupled via antenna ports (not shown in FIG. 2) with an antenna array 1013 including a plurality of antennas 1014. In some examples, the antenna array 1013 may include at least 30 antennas 1014, optionally at least 110 antennas, further optionally at least 200 antennas. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern.

The BS 101 further includes a memory 1015, e.g., a non-volatile memory. The memory may store program code that can be executed by the processor 1011. Executing the program code may cause the processor 1011 to perform techniques with respect to beam sweeps and determination of a beam configuration as disclosed herein. Thus, the processor 1011 and the memory 1015 form a control circuit.

The UE 102 includes a processor 1021 and an interface 1022, sometimes also referred to as frontend. The interface 1022 is coupled via antenna ports (not shown in FIG. 2) with an antenna array 1023 including a plurality of antennas 1024. In some examples, the antenna array 1023 may include at least 6 antennas, optionally at least 16 antennas, further optionally at least 32 antennas. Generally, the antenna array 1023 of the UE 102 may include fewer antennas 1024 then the antenna array 1013 of the BS 101. In some examples, it is even possible that the UE 102 does not include an antenna array 1023, but rather includes a single antenna. Each antenna 1024 may include one or more electrical traces to carry a radio frequency current. Each antenna 1024 may include one or more LC-oscillators implemented by the electrical traces. Each trace may radiate electromagnetic waves with a certain beam pattern.

The UE 102 further includes a memory 1025, e.g., a non-volatile memory. The memory 1025 may store program code that can be executed by the processor 1021. Executing the program code may cause the processor 1021 to perform techniques with respect to beam sweeps and determination of a beam configuration as described herein. Thus, the processor 1021 and the memory 1025 form a control circuit.

FIG. 2 also illustrates aspects with respect to propagation channels 151. FIG. 2 schematically illustrates that different propagation channels 151 (dashed lines in FIG. 2) are implemented on the wireless link 111. The different propagation channels 151 are associated with different beam configurations. For example, to implement a certain propagation channel 151 for DL communication, a certain DL transmit beam configuration may be selected for the antenna array 1013 of the BS 101. Here, the beam configurations may generally be implemented by certain antenna weights of the antennas 1014, 1024/antenna ports of the respective antenna array 1013, 1023. Sometimes, the antenna weights are also referred to as steering vectors. Accordingly, different beam configurations may be obtained by using different amplitude and phase configurations for the various antennas 1014, 1024/antenna ports of the respective antenna arrays 1013, 1023. Generally, beam configurations may be applied for transmission (transmit beam configurations) and/or reception (receive beam configurations). Furthermore, generally, beam configurations may be applied for DL communication (DL beam configurations) and/or UL communication (UL beam configurations).

Different ones of the propagation channels 151 may have different transmission characteristics such as number of reflections, path loss, and generally transmission reliability and/or capacity. In particular, different propagation channels 151 can have different fading profiles at the position of the respective receiver. Fading typically occurs due to destructive interference of reflected electromagnetic waves carrying the signals at the position of the receiver. By using appropriate propagation channels 151, diversity can be provided to reduce fading. According to various examples described herein, selection of the appropriate propagation channels 151 is facilitated.

Generally, such multi-beam operation is expected to be used in NR networks operated at carrier frequencies above 6 GHz. Here, the beam from both BS 101 and UE 102 should be aligned to avoid signal loss. To sound the wireless link 111 and the various propagation channels 152, pilot signals 152 can be transmitted and receive along the various propagation channels 152. For this, a beam sweep can be used. In multi-beam operation, beam sweeping operation can be required, particularly in scenarios where there is no or limited transmit/receive reciprocity at the BS 101 and/or at the UE 102.

Herein, techniques are disclosed which enable to determine a beam configuration used for transmission of data which provides favorable transmission characteristics. This is done based on one or more beam sweeps. According to beam sweeps, multiple beams are activated contemporaneously and/or subsequently to find out which one of the multiple beams corresponds to a propagation channel 151 having favorable transmission characteristics.

Figure 3:
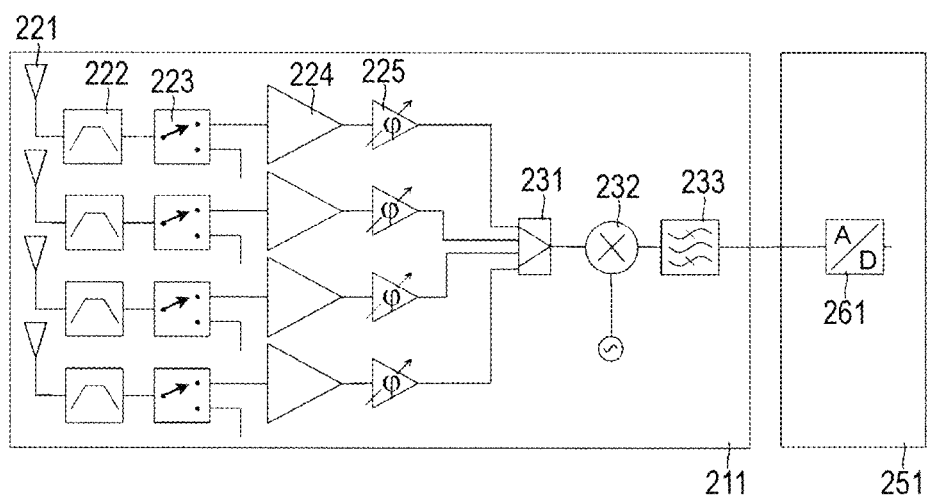
FIG. 3 schematically illustrates an interface of the UE or the base station according to various examples, wherein the interface is configured according to digital beamforming.

FIG. 3 illustrates aspects with respect to the interfaces 1012, 1022. FIG. 3 illustrates a receive interface, but similar techniques may be readily applied to a transmit interface. The example of FIG. 3 illustrates an architecture of the interface 1012, 1022 that may be employed for so-called analog beamforming.

Analog beamforming may typically employ a time-duplex configuration which is not capable of transmitting and/or receiving more than a single beam at each moment in time. Therefore, in a beam sweep according to analog beamforming, different beams of the beam sweep are not transmitted and/or received contemporaneously, but rather sequentially in time domain. This typically increases the time duration required for the beam sweep and, thus, increases the latency of subsequent transmission of data.

The interface 1012, 1022 includes an analog domain 211 and a digital domain 251. The analog domain 211 includes various analog components 221-225, 231-233 configured for signal processing in the analog domain.

The interface 1012, 1022 includes four antenna ports 221 for connection to the antennas 1014, 1024 of the respective antenna array 1013, 1023 (for sake of simplicity, in FIG. 3, the antenna port 221 is only labeled for one of the received channels). Next, a bandpass filter 222 and a RF switch 223 are provided. Programmable gain amplifiers 224 can implement channel-specific gains. The amplifiers 224 can be implemented by low-noise amplifiers. Phase sifters 225 are provided which can implement channel-specific phase shifts. Next, demodulation is implemented by a multiplier 232 and a filter 233. Then, the analog baseband signal is forwarded to an analog-to-digital converter 261 of the digital domain 251.

A beam configuration of a given beam defines a certain setting of the amplifiers 224 and the phase shifters 225. Here, the processing of the antenna signals received via the plurality of antenna ports 221 is assigned to the analog domain. Therefore, at a given moment in time, a single beam according to the respective beam configuration can be implemented.

The setup of FIG. 3, i.e., analog beamforming, is associated with comparably limited current consumption, because only a single analog-to-digital converter 261 is required. This is different in a scenario referred to as digital beamforming. Digital beamforming is illustrated by FIG. 4.

Figure 4:
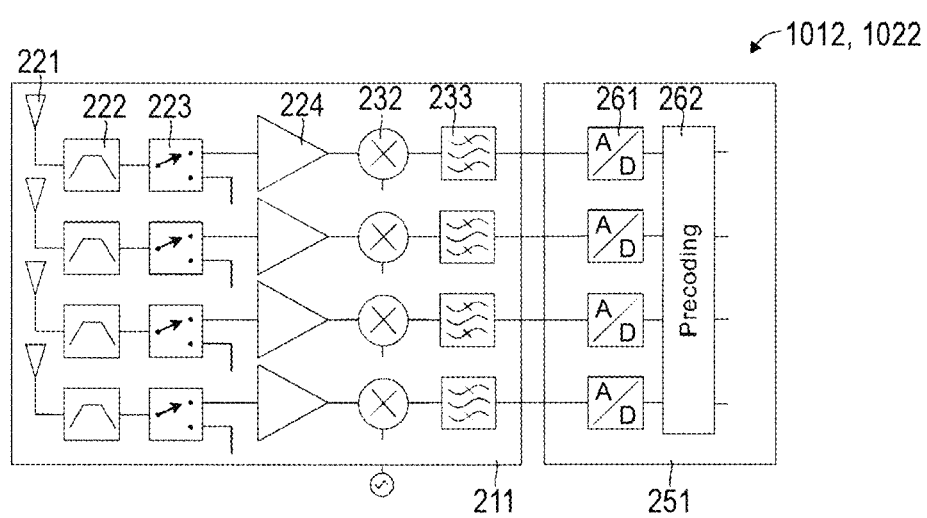
FIG. 4 schematically illustrates an interface of the UE or the base station according to various examples, wherein the interface is configured according to analog beamforming.

FIG. 4 illustrates aspects with respect to the interfaces 1012, 1022. FIG. 4 illustrates a receive interface, but similar techniques may be readily applied to a transmit interface. The example of FIG. 4 illustrates an architecture of the interface 1012, 1022 that may be employed for so-called digital beamforming.

Digital beamforming may typically employ a time-duplex configuration which is capable of transmitting and/or receiving more than a single beam at each moment in time. Therefore, in a beam sweep, different beams of the beam sweep can be transmitted and/or received contemporaneously. This reduces the time duration required for the beam sweep; therefore, subsequent transmission of data can commence with reduced latency.

In the example of FIG. 4, demodulation is performed in parallel for each receive channel. Also, multiple analog-to-digital converters 261 are provisioned, one for each receive channel. The phase shifts are applied by a digital precoder 262.

Therefore, from a comparison of the architectures of the interfaces 1012, 1022 of FIGS. 3 and 4, it follows that in the scenario FIG. 4 processing of the antenna signals associated with the plurality of antenna ports 221 is re-assigned to the digital domain 251 of the interface 1012, 1022.

The setup of FIG. 4, i.e., digital beamforming, is associated with comparably high current consumption, because multiple analog-to-digital converters 261 are required.

Digital beamforming may be employed using TDD between UL and DL; then, reciprocity applies. Digital beamforming could also be employed for FDD between UL and DL data transmission; then, reciprocity may not apply.

Figure 5:
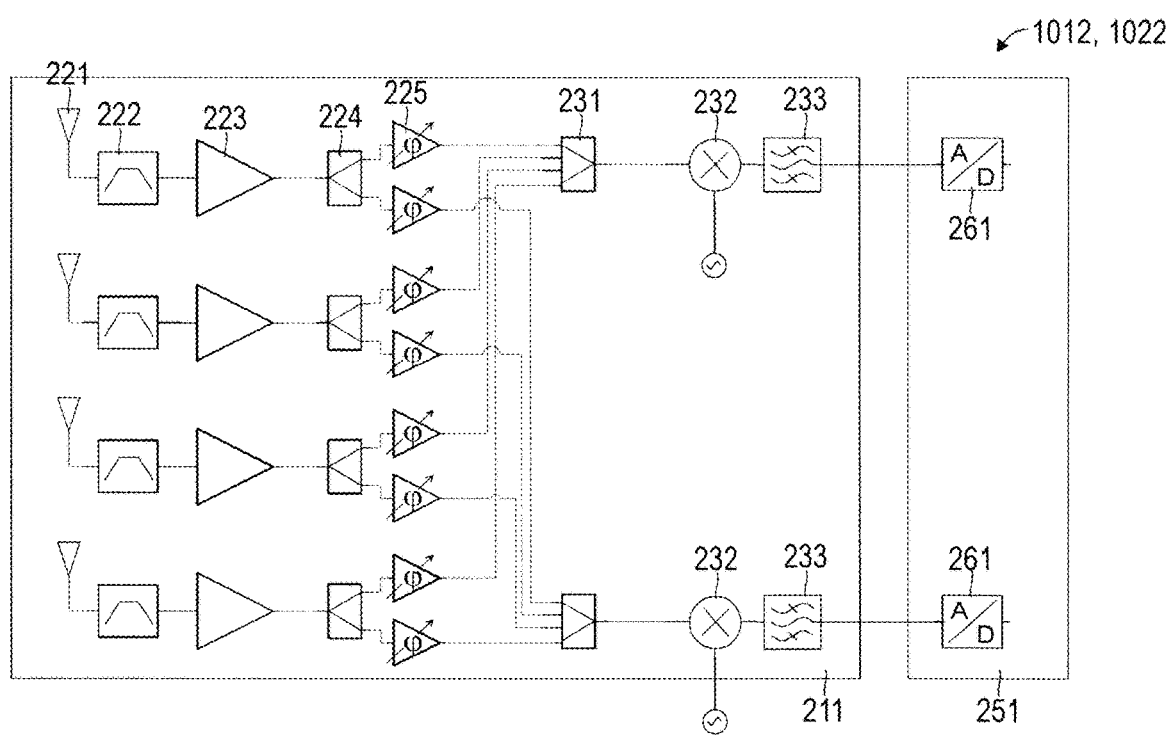
FIG. 5 schematically illustrates an interface of the UE or the base station according to various examples, wherein the interface is configured according to hybrid digital/analog beamforming.

FIG. 5 illustrates aspects with respect to the interfaces 1012, 1022. FIG. 5 illustrates a receive interface, but similar techniques may be readily applied to transmit interfaces. The example of FIG. 5 illustrates an architecture of the interface 1012, 1022 that may be employed for so-called hybrid beamforming.

Hybrid beamforming may typically employ a time-duplex configuration which is capable of transmitting and/or receiving more than a single beam at each moment in time, wherein, however, the flexibility in time-multiplexing arbitrary beams is limited. From a comparison of FIGS. 3 and 4 with FIG. 5, it is apparent that FIG. 5 employs an architecture logically arranged in-between the architectures of FIGS. 3 and 4. I.e., hybrid beamforming is an intermediate scenarios between analog and digital beamforming. In detail, the number of analog-to-digital converters 261 in the architecture according to the example of FIG. 5 is larger than one, but smaller than the number of receive channels. Therefore, in the example of FIG. 5, groups of two beams can be formed and the beams of each group can be received contemporaneously using the two analog-to-digital converters.

According to various examples, the interfaces 1012, 1022 may have the capability of dynamically switching between the different architectures according to the examples of FIGS. 3-5. In other words, it may be possible that one or more of the available analog-to-digital converters 261 are selectively deactivated or bypassed in order to reduce the current consumption. Then, depending on the particular setting, the capabilities with respect to the time-duplex configuration may change. Dynamic adjustment of the beam sweeps in accordance with the dynamic changes to the time-duplex configuration becomes possible by the various examples described herein.

Figure 6:
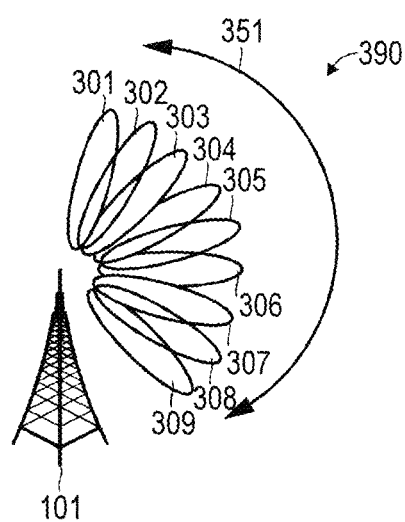
FIG. 6 schematically illustrates a beam sweep configured in accordance with beam sweep configuration information, comprising a plurality of beams, and performed by the base station according to various examples.

FIG. 6 illustrates aspects with respect to a beam sweep 390. The beam sweep 390 is performed by the BS 101. As such, the beam sweep 390 may be a DL transmit beam sweep or an UL receive beam sweep. In particular, FIG. 6 illustrates aspects with respect to the directional characteristics of the beam sweep 390.

The beam sweep 390 according to the example of FIG. 6 includes a total of nine beams 301-309. The beams 301-309 are characterized by different spatial profiles; in particular, the direction of the peak of each one of the beams 301-309 is offset if compared to the direction of the neighboring peaks 301-309. Thereby, a peak-to-peak range or opening angle 351 of the beam sweep 390 is obtained.

Generally, the beam sweep 390 can be characterized by a beam sweep configuration. The beam sweep configuration may define various parameters of the beam sweep 390 including, e.g., directional characteristics.

For example, the directional characteristics of the beam sweep configuration of the beam sweep 390 according to the example of FIG. 6 may specify that this beam sweep 390 includes a number of nine beams 301-309 at the illustrated two-dimensional spatial arrangement of the beams. The directional characteristics of the beam sweep 390 according to the example of FIG. 6 could also specify the peak-to-peak opening angle 351. Optionally, the directional characteristics could specify a sequence with which the various beams 301-309 are activated. Optionally, the directional characteristics could also specify a beam width of the various beams 301-309. While in the example of FIG. 6 a two-dimensional spatial arrangement of the beams 301-309 is illustrated, in other examples a three-dimensional spatial arrangement of beams would be possible.

Figure 7:
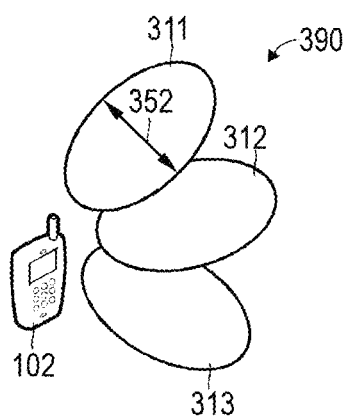
FIG. 7 schematically illustrates a beam sweep configured in accordance with beam sweep configuration information, comprising a plurality of beams, and performed by the UE according to various examples.

FIG. 7 illustrates aspects with respect to a beam sweep 390. The beam sweep 390 is performed by the UE 102. As such, the beam sweep 390 may be a UL transmit beam sweep or a DL receive beam sweep. In particular, FIG. 7 illustrates aspects with respect to the directional characteristics of the beam sweep 390.

The beam sweep 390 according to the example of FIG. 7 includes a total of three beams 311-313. In FIG. 7, the beam width 352 of the beam 311 is illustrated exemplarily. Also, the beam sweep 390 according to the example of FIG. 7 could be specified by a certain beam sweep configuration, including, e.g., respective directional characteristics.

FIG. 8 illustrates aspects with respect to a beam sweep 390. In particular, FIG. 8 illustrates aspects with respect to frequency bands 410 allocated for the pilot signals 152 transmitted and/or received in the beam sweep 390 in accordance with the beam sweep configuration. In the example of FIG. 8, the pilot signals 152 transmitted and/or received in the different beams 301-309 all employ the same frequency band 410. In other examples, it would be possible that pilot signals 152 transmitted and/or received in different beams 301-309 employ different frequency bands 410 (not illustrated in FIG. 8), e.g., in terms of center frequency and/or bandwidth.

Furthermore, FIG. 8 illustrates aspects with respect to a time-duplex configuration of the beam sweep configuration of the beam sweep 390. The time-duplex configuration may generally define a time-alignment of the various beams 301-309 of the beam sweep. The time-duplex configuration may generally define a degree of time-parallelization of the transmission and/or reception of the pilot signals 151 on the various beams. This degree of time-parallelization may generally vary between no parallelization and full parallelization.

In the example of FIG. 8, the pilot signals 152 are not transmitted and/or received contemporaneously in the different beams 301-309. For example, such a sequential configuration using dedicated time slots 361-369 for each beam 301-309 of the beam sweep could be implemented by analog beamforming.

FIG. 9 illustrates aspects with respect to a beam sweep 390. In particular, FIG. 9 illustrates aspects with respect to the time-duplex configuration of the beam sweep configuration of the beam sweep 390.

In the example of FIG. 9, some of the pilot signals 152 are transmitted and/or received contemporaneously in different beams 301-309. For example, the pilot signals 152 are transmitted and/or received contemporaneously in time slot 361 in the beams 301-303. Likewise, the pilot signals 152 are transmitted and/or received contemporaneously in time slot 365 in the beams 307-309. The pilot signals 152 transmitted and/or received in the beams 304-306 have dedicated timeslots 362-364. For example, such a partly contemporaneous/partly sequential configuration of the beam sweep 390 could be implemented by hybrid beamforming.

In the example of FIG. 9—employing hybrid beamforming—the time-duplex configuration of the beam sweep configuration could be indicative of at least two beams 301-303, 307-309 of the plurality of beams 301-309 of the beam sweep 390 for which the respective pilot signals 152 are transmitted and/or received contemporaneously. For example, the respective time slots 361, 365 could be indicated together with links or pointers to the respective beams 301-303, 307-309.

FIG. 10 illustrates aspects with respect to a beam sweep 390. In particular, FIG. 10 illustrates aspects with respect to frequency bands 410 allocated to the pilot signals 152 transmitted and/or received in the beam sweep 390 in accordance with the beam sweep configuration. In the example of FIG. 10, the pilot signals 152 transmitted and/or received in the different beams 301-309 employ different frequency bands 410.

Furthermore, FIG. 10 illustrates aspects with respect to a time-duplex configuration of the beam sweep configuration of the beams 390. In the example of FIG. 10, the pilot signals 152 are all transmitted and/or received contemporaneously in the different beams 301-309 using a single time slot 361. For example, such a fully contemporaneous configuration of the beam sweep could be implemented by digital beamforming.

In the example of FIG. 10—employing digital beamforming—the time-duplex configuration of the beam sweep configuration could be indicative of at least two beams 301-309 of the plurality of beams 301-309 of the beam sweep 390 for which the respective pilot signals 152 are transmitted and/or received contemporaneously. For example, the respective time slot 361 could be indicated together with links or pointers to the respective beams 301-309.

The beam sweep configuration is not restricted to the time-duplex configuration. Other information may be included in the beam sweep configuration, alternatively or additionally. For example, the beam sweep configuration could be indicative of a time-per-beam 399 for the plurality of beams 301-309. In some examples, the time-per-beam 399 could correspond to the duration of a transmission time interval. A further example of information included in the beam sweep configuration relates to the frequency bands 410 used for transmission of the pilot signals 152 in the beams 301-309.

Figure 11:
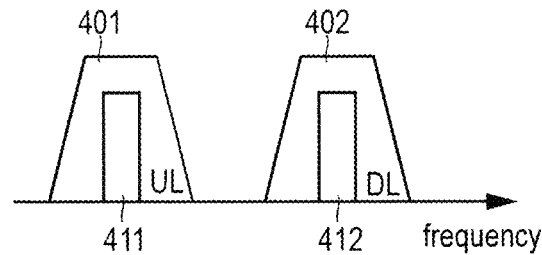
FIG. 11 schematically illustrates frequency bands used for transmission of data and transmission of pilot signals in one or more beam sweeps and according to various examples.

FIG. 11 illustrates aspects with respect to the frequency band 411 indicated by the beam sweep configuration and allocated for the UL pilot signals 152 on the wireless link 111. As illustrated in FIG. 11, the frequency band 411 allocated by the UL pilot signals 152 has a bandwidth which is smaller than the bandwidth of the frequency band 401 allocated for the transmission of the UL data.

Furthermore, FIG. 11 corresponds to a scenario where FDD is employed in order to mitigate interference between transmission of UL data and transmission of DL data. Hence, the frequency band 402 allocated for the transmission of DL data is different from frequency band 401 allocated for the transmission of the UL data. The bandwidth of the frequency band 412 allocated for the DL pilot signals 152 is again smaller than the bandwidth of the frequency band 402 allocated for the transmission of the DL data.

Figure 12:
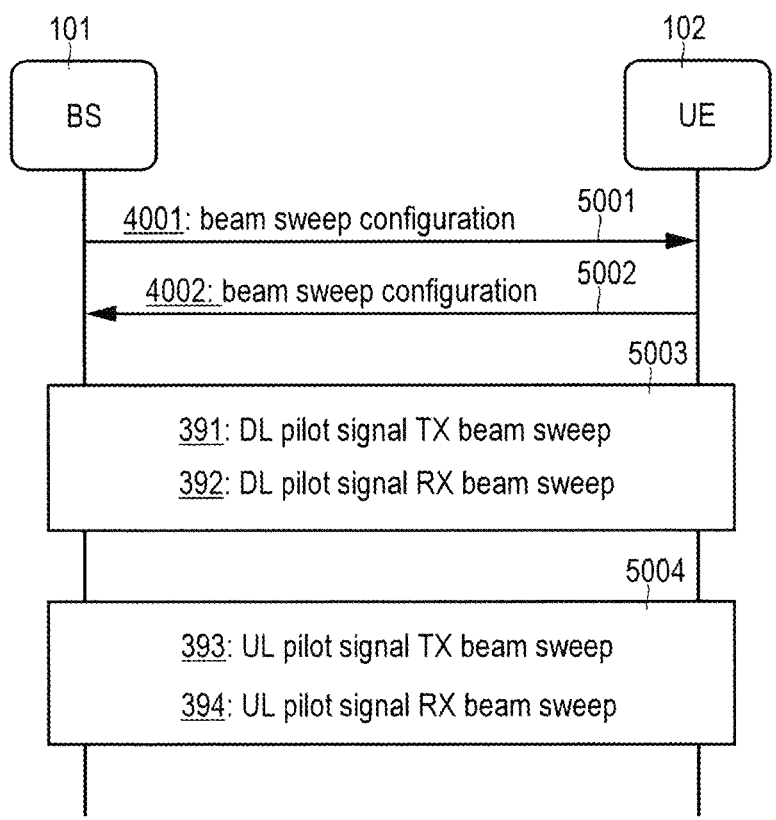
FIG. 12 is a signaling diagram schematically illustrating exchanging beam sweep configurations for a plurality of beam sweeps and according to various examples.

FIG. 12 is a signaling diagram illustrating aspects with respect to exchange of beam sweep configurations 4001, 4002. For example, the implementation of FIG. 12 could be implemented for the scenario of FIG. 11. Here, FDD of the transmission of data requires separate beam sweeps 391-394 for UL pilot signals 152 and DL pilot signals 152, respectively. This is because reciprocity between UL and DL may not be given. Generally, sometimes one or more or even all of the beam sweeps 391-394 may not be required, e.g., if the UE may benefit from reciprocity.

A DL control message 5001 is transmitted by the BS 101 and received by the UE 102. In some examples, the DL control message 5001 may be broadcasted by the BS 101, e.g., using a repeatedly transmitted system information block.

The DL control message 5001 is indicative of a beam sweep configuration 4001. For example, the DL control message 5001 could be indicative of a time-duplex configuration of the plurality of beams of one or more beam sweeps. Alternatively or additionally, the DL control message 5001 could be indicative of a frequency band 410-412 allocated for the pilot signals 152 transmitted and/or received in a plurality of beams of the one or more beam sweeps. Alternatively or additionally, the DL control message 5002 could be indicative of directional characteristics of one or beam sweeps.

Next, an UL control message 5002 is transmitted by the UE 102 and received by the BS 101. For example, the UL control message 5002 could be indicative of a time-duplex configuration of the plurality of beams of one or more beam sweeps. Alternatively or additionally, the UL control message 5002 could be indicative of a frequency band 410-412 allocated for the pilot signals 152 transmitted and/or received in a plurality of beams of the one or more beam sweeps. Alternatively or additionally, the UL control message 5002 could be indicative of directional characteristics of one or beam sweeps.

The control messages 5001, 5002 could be Layer 2 or Layer 3 control messages according to the Open Systems Interconnect (OSI) model. For example, Radio Resource Control (RRC) control messages could implement the control messages 5001, 5002.

Beyond the beam sweep configuration of the BS 101, the UE 102 could also receive control messages of further BSs (not illustrated in FIG. 12). I.e., it would be possible that the UE 102 receives control messages from BSs to which it is not connected or not camping on. This could facilitate subsequent handovers from a serving BS to a target BS in a cellular network. In particular, it would be possible that the UE 102 is aware of the beam sweep configuration of the target BS in the handover even prior to initiating direct bi-directional communication with the target BS. The latency of the handover can then be reduced. In particular, it may not be required to perform the exchange of the beam sweep configuration between the UE 102 and the target BS during the handover procedure; this can be done predictively.

For example, the UE 102 could share the beam sweep configuration with one or more further UEs connected via a device-to-device link, sometimes referred to as sidelink. Further examples include exchange of the beam sweep configuration between two BSs.

Next, at 5003, beam sweeps 391, 392 each including a plurality of beams is executed. The beam sweep 391 is a transmit beam sweep of the BS 101 transmitting DL pilot signals 152. The beam sweep 392 is a receive beam sweep of the UE 102 receiving the DL pilot signals 152. For example, the beam sweeps 391, 392 can be implemented in accordance with the beam sweep configuration 4001 indicated by the DL control message 5001. The beam sweeps 391, 392 can be time-synchronized.

At 5004, beam sweeps 393, 394 each including a plurality of beams are executed. The beam sweep 393 is a transmit beam sweep of the UE 102 transmitting UL pilot signals 152. The beam sweep 394 is a receive beam sweep of the BS 101 receiving the UL pilot signals 152. For example, the beam sweeps 393, 394 can be implemented in accordance with the beam sweep configuration 4002 indicated by the UL control message 5002. The beam sweeps 393, 394 can be time-synchronized.

In the example of FIG. 12, the decision logic for determining the beam sweep configurations 4001, 4002 resides at the respective transmitting side, i.e., for the beam sweeps 391, 392 at the BS 101 and for the beam sweeps 393, 394 at the UE 102.

In other scenarios, other distributions of the decision logic for determining the beam sweep configurations are conceivable. For example, it would be possible that the BS 101 and the UE 102 negotiate each beam sweep configuration using bidirectional control signaling. Here, it would be possible that the BS 101 and the UE 102 exchange information on the respective beam sweep capabilities and that, in turn, the particular beam sweep configurations used for implementing the beam sweeps 391-394 are selected from a plurality of respectively defined candidate beam configurations exchanged between the BS 101 and the UE 102. The beam sweep capabilities may indicate support for analog, digital, or hybrid beamforming.

In such scenarios, generally, the candidate beam configuration can differ between UL and DL. Different control message may be exchanged in this regard.

Figure 13:
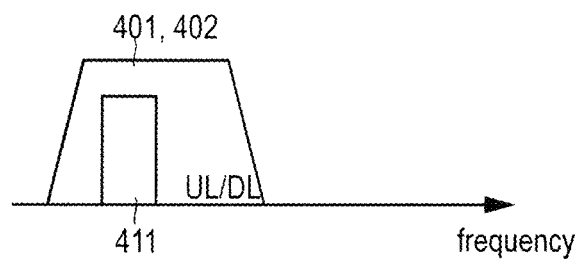
FIG. 13 schematically illustrates frequency bands used for transmission of data and transmission of pilot signals in one or more beam sweeps according to various examples.

FIG. 13 illustrates aspects with respect to the frequency band 411 indicated by the beam sweep configuration and allocated by the UL pilot signals 152 on the wireless link 111. As illustrated in FIG. 13, the frequency band 411 allocated by the UL pilot signals 152 is smaller than the frequency band 401, 402 allocated for the transmission of the UL data and the DL data. Furthermore, FIG. 13 corresponds to a scenario where TDD is employed in order to mitigate interference between transmission of UL data and transmission of DL data. FDD is not employed. Hence, the frequency band 402 allocated for the transmission of DL data overlaps with the frequency band 401 allocated for the transmission of the UL data.

Figure 14:
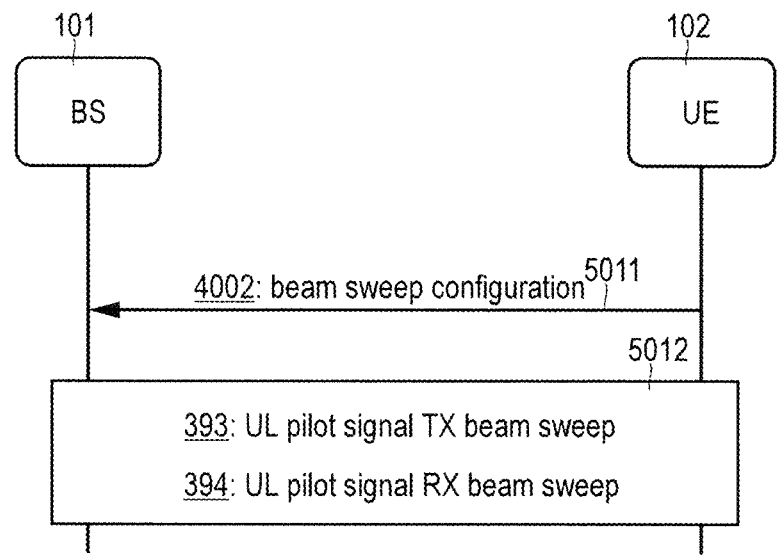
FIG. 14 is a signaling diagram schematically illustrating exchanging beam sweep configurations for a plurality of beam sweeps and according to various examples.

FIG. 14 is a signaling diagram illustrating aspects with respect to exchange of a beam sweep configuration 4002. For example, the implementation of FIG. 14 could be implemented for the scenario of FIG. 13. Here, a TDD configuration of the transmission of data does not require separate beam sweeps for UL pilot signals 152 and DL pilot signals 152, respectively. This is why the beam sweeps 393, 394 for the UL pilot signals 152 are employed, but beam sweeps for DL pilot signals 152 are not employed. A control message 5001 is indicative of the beam sweep configuration 4002 for the beam sweeps 393, 394.

The reciprocity enables to determine the beam configuration of the beam used for transmission of DL data based on the beam configuration of the beam used for transmission of UL data; said beam configuration for transmission of the UL data can, in turn, be determined based on a receive property of the UL pilot signals 152 transmitted and received in the beam sweeps 393, 394 at block 5012.

While in the example of FIG. 14 a scenario is illustrated where beam sweeps 393, 394 are implemented for the UL pilot signals 152, similar techniques may be applied for beam sweeps implemented for DL pilot signals 152.

Figure 15:
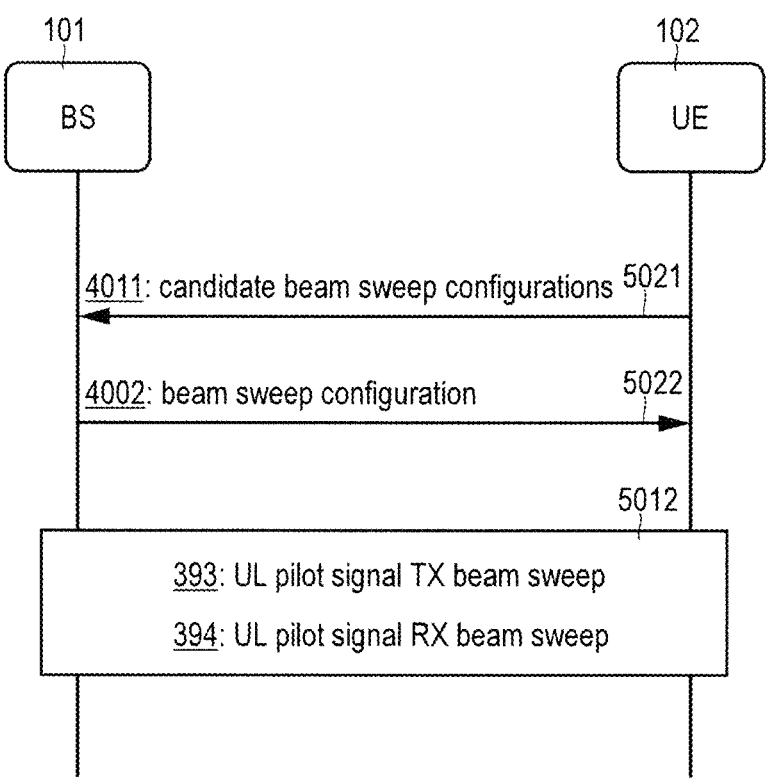
FIG. 15 is a signaling diagram schematically illustrating exchanging beam sweep configurations for a plurality of beam sweeps and according to various examples.

FIG. 15 is a signaling diagram illustrating aspects with respect to exchange of a beam sweep configuration. The example of FIG. 15 generally corresponds to the example of FIG. 14. However, in the example of FIG. 15, the decision logic for determining the beam sweep configuration (4002) according to which the beam sweeps 393, 394 are configured does not solely reside at the UE 102, but rather also partly resides at the BS 101. For this, the UE 102 sends a UL control message at 5021, the UL control message being indicative of a plurality of candidate beam sweep configurations 4011 supported by the capability of the UE 102. Then, the BS 101 determines the beam sweep configuration 4002 based on the candidate beam sweep configurations 4011 and reports the selected beam sweep configuration 4002 using a DL control message 5022.

A similar scenario would be conceivable where the BS 101 indicates candidate beam sweep configurations to the UE 102 and the UE selects the beam sweep configuration from the candidate beam sweep configurations.

Figure 16:
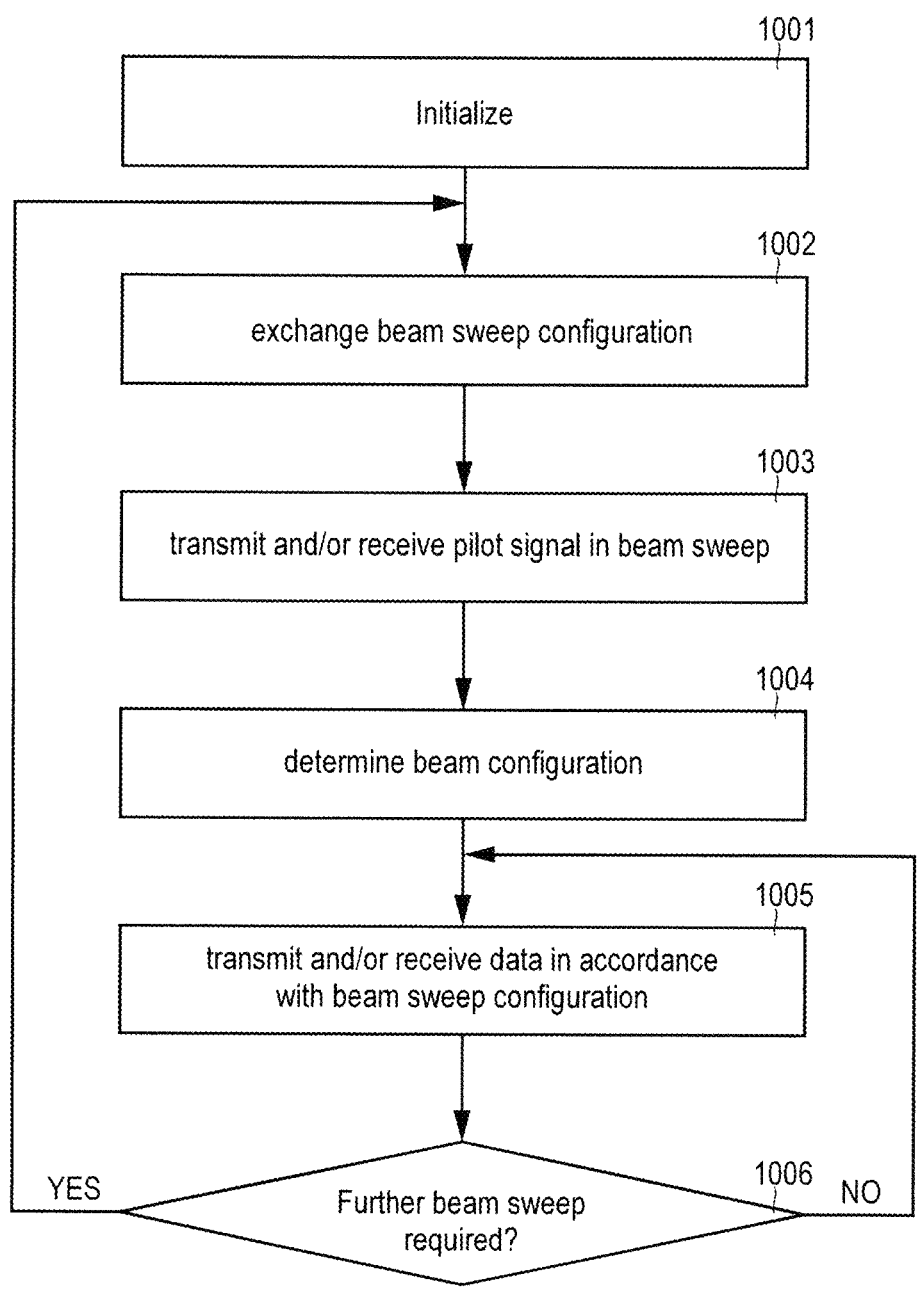
FIG. 16 is a flowchart of a method according to various examples.

FIG. 16 is a flowchart of a method according to various examples. First, in block 1001, communication between the BS 101 and the UE 102 is initiated in a standardized manner. For example, the initialization according to block 1001 could be implemented using default beam configurations for beams used for transmission of data between the UE 102 and the BS 101. For example, the initialization according to block 1001 could be implemented using predefined beam sweep configurations for beam sweeps including a plurality of beams for UL pilot signals 152 and/or DL pilot signals 152.

Next, in block 1002, a beam sweep configuration is exchanged between the BS 101 and the UE 102. This may include transmission of one or more control messages indicative of the beam sweep configuration and/or of the plurality of candidate beam sweep configurations. For example, in block 1002, it would be possible that the BS 102 shares its beam sweep capability with the UE 102. This may correspond to exchanging a plurality of candidate beam sweep configurations between the BS 101 and the UE 102. Then, the UE may select the beam sweep configuration from the plurality of candidate beam sweep configurations and indicate the latter to the BS 101.

For example, in block 1002 decision logic may be employed which determines the beam sweep configuration based on a selection from a plurality of candidate beam sweep configuration in view of different criteria. Such criteria may include latency of the subsequent transmission of data and/or energy consumption. For example, if the latency should be reduced, there may be a tendency towards digital beamforming transmitting and/or receiving pilot signals contemporaneously. Differently, if the energy consumption should be reduced, there may be a tendency towards analog beamforming not transmitting and/or receiving pilot signals contemporaneously. This may, in particular, apply for scenarios where the communication bandwidth is large.

Then, in block 1003, pilot signals 152 are transmitted and/or received (communicated) in one or more beam sweeps. For example, the interfaces 1012, 1022 of the BS 101 and the UE 102 could be controlled to transmit and/or receive pilot signals 152 in a plurality of beams of the one or more beam sweeps and in accordance with the beam sweep configuration exchanged in block 1002.

Then, in block 1004 a beam configuration for subsequent transmission of UL data and/or DL data is determined based on a receive property of the pilot signals 152.

In block 1005, the data is communicated in accordance with the beam sweep configuration determined at block 1004.

Next, in block 1006, it is checked whether updated determination of the beam configuration should be triggered. Different decision criteria can be taken into account in block 1006. Examples include a downcount or timeout. Further examples include the mobility of the UE 102 and/or the BS 101. For example, if the mobility of the UE 102 exceeds a threshold, it can be judged in block 1006 that an updated beam configuration should be determined.

If it is judged in block 1006 that an updated beam configuration should be determined, blocks 1002-1004 are executed anew. Otherwise, communication of data in block 1005 commences with the previously determined beam configuration.

Figure 17:
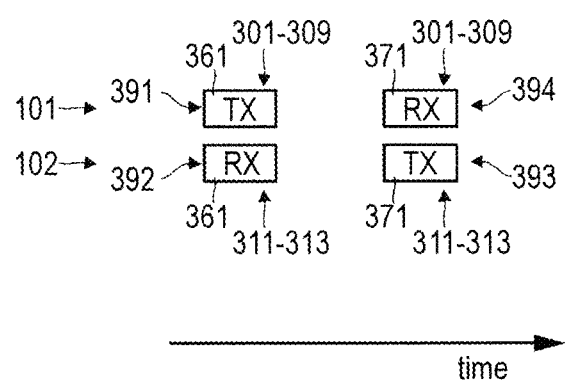
FIG. 17 schematically illustrates time synchronization between transmit beam sweeps and receive beams sweeps according to various examples.

FIG. 17 illustrates aspects with respect to the time synchronization of various beam sweeps 391-394. In particular, FIG. 7 illustrates aspects with respect to the time synchronization between the transmit beam sweep 391 for DL pilot signals 152 and the receive beam sweep 392 for the DL pilot signals 152, as well as aspects with respect to the time synchronization between the transmit beam sweep 393 for UL pilot signals 152 and the receive beam sweep 394 for the UL pilot signals 152.

For example, the scenario of FIG. 17 could be implemented in cases where, both, the BS 101, as well as the UE 102 support digital beamforming. Then, the BS 101, in time slot 361, transmits the DL pilot signals 152 in all beams 301-309 contemporaneously. For example, this could be done in a comparably narrow bandwidth 412 for each beam 301-309. The DL pilot signals 152 transmitted in the various beams 301-309 may be allocated in the same or different frequency bands 412.

The UE 102 receives the DL pilot signals 152 in all beams 311-313 contemporaneously. Then, the UE 102 can be configured to determine the beam configuration based on the received properties of the DL pilot signals 152 received in the various beams 311-313. For example, the beam configuration could be selected in accordance with the particular beam 311-313 which has the strong a signal-to-noise ratio of the associated DL pilot signals 152. A corresponding beam configuration can be determined.

Then, the UE 102 transmits, in time slot 371 and contemporaneously on all beams 311-313, UL pilot signals 152 according to the beam sweep 393. The BS 101 receives the UL pilot signals 152 in the time slot 371 contemporaneously on all beams 301-309 according to the beam sweep 394. Then, the BS 101 can determine the appropriate beam configuration based on the receive property of the UL pilot signals 152.

While in the scenario of FIG. 17 different time slots 361, 371 are employed for the beam sweeps 391, 392 and the beam sweeps 393, 394, respectively, due to FDD it would also be possible to implement the beam sweeps 391-394 in one and the same time slot. This may be referred to as full duplex transmission.

The time synchronization may be achieved by indicating the support for digital beamforming between the BS 101 and the UE 102, i.e., based on the respective time-duplex configuration indicated by the beam sweep configuration 4001, 4002, and/or indicating the time slot 361 used for transmission and reception of the pilot signals 152.

Figure 18:
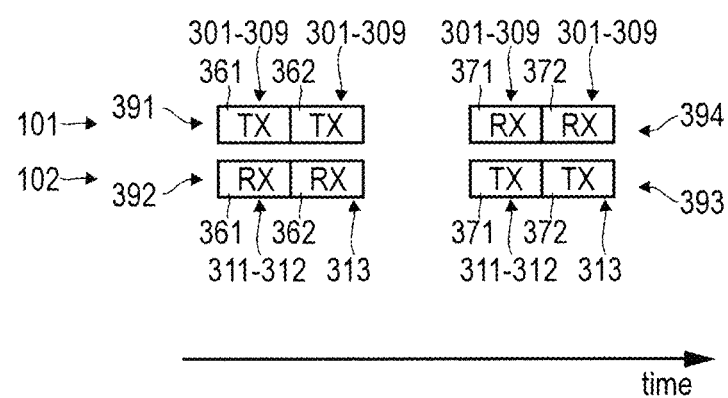
FIG. 18 schematically illustrates time synchronization between transmit beam sweeps and receive beams sweeps according to various examples.

FIG. 18 illustrates aspects with respect to the time synchronization of various beam sweeps 391-394. In particular, FIG. 18 illustrates aspects with respect to the time synchronization between the transmit beam sweep 391 for DL pilot signals 152 and the receive beam sweep 392 for the DL pilot signals 152, as well as aspects with respect to the time synchronization between the transmit beam sweep 393 for UL pilot signals 152 in the receive beam sweep 394 for the UL pilot signals 152.

The scenario of FIG. 18 could be implemented in cases where the BS 101 supports digital beamforming while the UE 102 supports hybrid beamforming. This could be indicated by the time-duplex configuration of the beam sweep configuration 4001, 4002.

For example, in timeslots 361, 362, the BS 102 transmits the DL pilot signals 152 in all beams 301-309 according to the beam sweep 391. However, the UE 102, in the time slot 361 receives the DL pilot signals 152 in the beams 311-312, but not in the beam 313; in the time slot 362, the UE 102 receives the DL pilot signals 152 in the beam 313.

A similar scenario would be conceivable where the BS 101 supports hybrid beamforming while the UE 102 supports digital beamforming.

Figure 19:
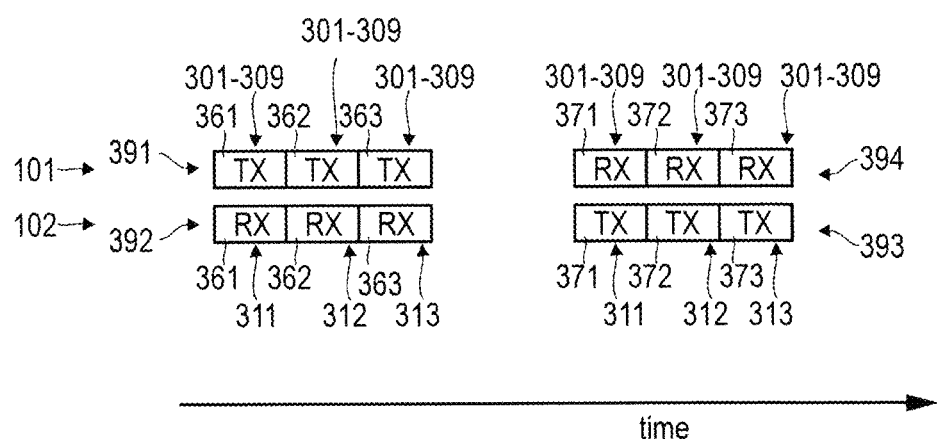
FIG. 19 schematically illustrates time synchronization between transmit beam sweeps and receive beams sweeps according to various examples.

FIG. 19 illustrates aspects with respect to the time synchronization of various beam sweeps 391-394. In particular, FIG. 19 illustrates aspects with respect to the time synchronization between the transmit beam sweep 391 for DL pilot signals 152 and the receive beam sweep 392 for the DL pilot signals 152, as well as aspects with respect to the time synchronization between the transmit beam sweep 393 for UL pilot signals 152 and the receive beam sweep 394 for the UL pilot signals 152.

The scenario of FIG. 19 could be implemented in cases where the BS 101 supports digital beamforming by the UE 102 supports analog beamforming. This could be indicated by the time-duplex configuration of the beam sweep configuration 4001, 4002.

Here, the BS 101 transmits the DL pilot signals 152 in the timeslots 361-363 in all beams 301-309 contemporaneously. This could be done in a comparably narrow bandwidth 412 for each beam 301-309. The various pilot signals 152 transmitted in the different beams 301-309 could be allocated on the same or on different frequencies.

The UE 102 receives in a single beam 311-313 per time slot 361-363.

A similar scenarios implemented for the beam sweeps 393, 394. Again, the BS 101 can receive the UL pilot signals 152 in all beams 301-309 during the various timeslots 371-373.

As will be appreciated from the scenario of FIG. 19, if there is reciprocity, the beam sweeps 393, 394 may not be required. Rather, the UE 102 could transmit the UL pilot signal using the reciprocal beam configuration determined from the receive property of the DL pilot signals 152 received during the beam sweep 392.

Figure 20:
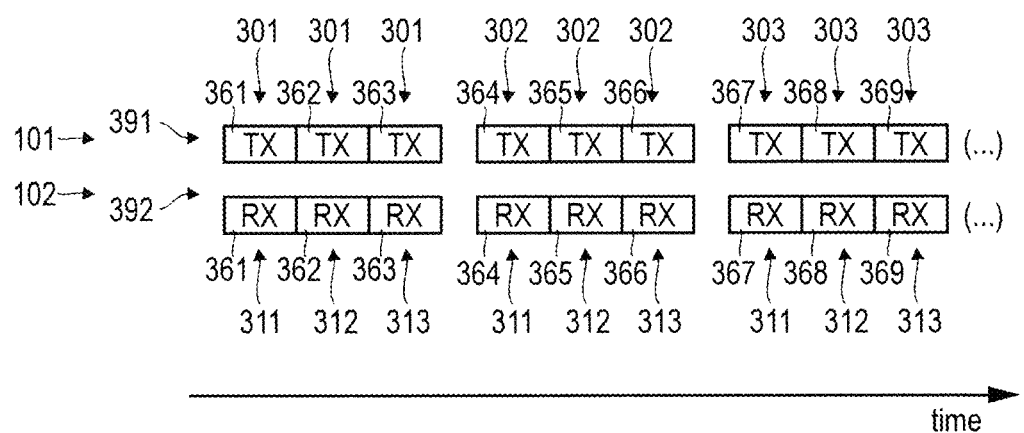
FIG. 20 schematically illustrates time synchronization between transmit beam sweeps and receive beams sweeps according to various examples.

FIG. 20 illustrates aspects with respect to the time synchronization of various beam sweeps 391-392. In particular, FIG. 20 illustrates aspects with respect to the time synchronization between the transmit beam sweep 391 for DL pilot signals 152 and the receive beam sweep 392 for the DL pilot signals 152 (in FIG. 20, for sake of simplicity, the entire beam sweeps 391, 392 are not illustrated, but rather only excerpts of the beam sweeps 391, 392).

The scenario of FIG. 20 could be implemented in cases where the BS 101 supports analog beamforming and the UE 102 supports analog beamforming, as well.

The BS 101 can transmit DL pilot signals 152 in the beam 301 in the subsequent timeslots 361-363. This could be done in a comparably narrow bandwidth 412.

The UE 102 receives the DL pilot signals 152 transmitted in the beam 301 in different beams 311-313 for the subsequent timeslots 361-363.

Next, the BS 101 transmits the DL pilot signals 152 in the beam 302 and then in the beam 303, and so on. This can proceed until the receive property of the DL pilot signals 152 indicates a sufficient signal-to-noise ratio.

Similar considerations with respect to reciprocity may apply for the scenario of FIG. 20 as have already been explained with respect to the scenario of FIG. 19 (in the example of FIG. 20, the beam sweeps 393, 394 are not illustrated for sake of simplicity).

For facilitating the time synchronization between the various beam sweeps at 391-394 in the scenarios discussed above, it is possible to exchange the beam sweep configuration indicative of the time-duplex configuration of the plurality of beams. In particular, the time-duplex configuration can indicate whether one of the scenarios according to FIGS. 17-20 applies where analog/digital beamforming is supported by the BS 101 and/or the UE 102, respectively. Furthermore, it would be possible that the beam sweep configuration is indicative of a time-per-beam for the plurality of beams 301-309, 311-313 of the beam sweeps 391-394. For example, the time-per-beam can correspond to the duration of the various timeslots 361-369. The time-per-beam could also be expressed in terms of a sweep rate. The time synchronization is further facilitated by the directional characteristics of the beam sweeps 391-394 which may be indicative of the number of beams, etc. All such properties may be taken into account when time-synchronizing between transmit beam sweep and receive beam sweep.

Summarizing, above techniques have been disclosed which enable to exchange information on the beam sweep capability between different nodes of a network, e.g., between a BS and a UE of the network. Based in such beam sweep capability, it is possible to find a beam sweep configuration which enables to optimize one or more beam sweeps used to determine a beam configuration for a subsequent transmission of data. Such optimization can consider an objective function defined with respect to energy consumption associated with the beam sweep and/or latency requirement of the transmission of the data.

For example, based on the beam sweep capabilities of the participating nodes, it is possible to find a beam sweep configuration which determines one or more beam sweeps. For example, the beam sweep configuration can be indicative of the number of beams of the one or more beam sweeps, a beam width of the beams of the one or more beam sweeps, a time per beam for the beams of the one or more beam sweeps/a beam switching response time, a maximum supported bandwidth, etc.

Time synchronization between transmit and receive beam sweeps can be achieved. This can take into account capability of the transmit and/or receive in terms of digital beamforming, analog beamforming, and hybrid beamforming.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while various techniques have been described with respect to UL and DL transmission between a UE and a BS, respective techniques may be readily applied to sidelink communication between multiple mobile devices, sometimes also referred to as device to device communication.

Furthermore, while various scenarios have been described with respect to exchange of the beam sweep configuration between BS and UE, similar techniques may be readily applied to exchange of the beam sweep configuration between multiple BSs, e.g., a source BS and a target BS of a predicted handover. Thereby, the latency of the handover can be reduced, because the exchange of the beam sweep configuration between the UE and the target BS can be performed prior to the execution of the handover procedure.

Further, while various examples have been described with respect to receive interfaces, similar techniques may be readily applied for transmit interfaces.

Further, while various example implementations of the beam sweep configuration have been discussed, further examples are conceivable. For example, the beam sweep configuration could also be indicative of the periodicity between two beam sweeps, the time between two sweeps, or—generally—timing information regarding execution of the beam sweeps.

Further, while various examples have been described in the context of cellular networks, similar techniques may be readily applied to other kinds and types of networks, e.g., peer-to-peer networks.

The invention claimed is:

1. A method of a node of a network determining a beam configuration of a beam used for transmission of data on a wireless link of the network, the method comprising:
    exchanging, with a further node of the network, a beam sweep configuration, wherein the beam sweep configuration is indicative of a time-duplex configuration of a plurality of beams of each beam sweep of at least one beam sweep,
    transmitting and/or receiving pilot signals in the plurality of beams of the at least one beam sweep which is configured in accordance with the beam sweep configuration,
    determining the beam configuration based on a receive property of the pilot signals, and
    implementing the time-duplex configuration by re-assigning processing of antenna signals associated with a plurality of antenna ports of an interface of the node between an analog domain of the interface and a digital domain of the interface when transmitting and/or receiving the pilot signals.

2. The method of claim 1,
wherein the time-duplex configuration is indicative of at least two beams of the plurality of beams of each beam sweep for which the respective pilot signals are transmitted and/or received contemporaneously.

3. The method of claim 1, further comprising:
time-synchronizing the at least one beam sweep with the further node based on the time-duplex configuration.

4. A method of a node of a network determining a beam configuration of a beam used for transmission of data on a wireless link of the network, the method comprising:
exchanging, with a further node of the network, a beam sweep configuration,
transmitting and/or receiving pilot signals in a plurality of beams of at least one beam sweep which is configured in accordance with the beam sweep configuration, and
determining the beam configuration based on a receive property of the pilot signals,
wherein the beam sweep configuration is indicative of a time-per-beam for the plurality of beams of each beam sweep.

5. The method of claim 4,
wherein the beam sweep configuration is indicative of a frequency band allocated for the pilot signals on the wireless link.

6. The method of claim 4,
wherein the beam sweep configuration is indicative of directional characteristics of the at least one beam sweep, wherein the directional characteristics are optionally selected from the group comprising: a number of beams; a two-dimensional spatial arrangement of beams; a three-dimensional spatial arrangement of beams; a beam width of beams; a peak-to-peak opening angle of the at least one beam sweep; and a sweep sequence of beams.

7. The method of claim 4, further comprising:
selecting the beam sweep configuration from a plurality of candidate beam sweep configurations exchanged with the further node.

8. The method of claim 4, further comprising:
determining the beam sweep configuration based on at least one of a latency requirement of the transmission of the data and an energy consumption associated with the beam sweep.

9. A method of a node of a network determining a beam configuration of a beam used for transmission of data on a wireless link of the network, the method comprising:
exchanging, with a further node of the network, a beam sweep configuration,
transmitting and/or receiving pilot signals in a plurality of beams of at least one beam sweep which is configured in accordance with the beam sweep configuration,
determining the beam configuration based on a receive property of the pilot signals, and
repeatedly triggering said determining of the beam configuration based on at least one of a mobility of the node and a mobility of the further node.

10. The method of claim 9,
wherein the at least one beam sweep comprises a transmit beam sweep and/or a receive beam sweep,
wherein the pilot signals comprise uplink pilot signals and/or downlink pilot signals.

11. The method of claim 9, further comprising:
negotiating the beam sweep configuration with the further node based on a beam sweep capability, the beam sweep capability comprising at least one of analog beamforming, digital beamforming, and hybrid beamforming.

12. The method of claim 9,
wherein the node is a user equipment connected to the network via a base station,
wherein the further node is selected from the group comprising: the base station;
a target base station of the network to which a handover of the user equipment is predicted; a further user equipment communicating with the user equipment via a sidelink of the network.

13. A node of a network, comprising:
an interface for transmission on a wireless link of the network, and
a control circuit configured to determine a beam configuration of a beam used for transmission of data by the interface by: exchanging, with a further node of the network, a beam sweep configuration; controlling the interface to transmit and/or receive pilot signals in a plurality of beams of at least one beam sweep which is configured in accordance with the beam sweep configuration; and determining the beam configuration based on a receive property of the pilot signals,
wherein the beam sweep configuration is indicative of a time-duplex configuration of the plurality of beams of each beam sweep of the at least one beam sweep,
wherein the interface is configured to implement the time-duplex configuration by re-assigning processing of antenna signals associated with a plurality of antenna ports of the interface between an analog domain of the interface and a digital domain of the interface when transmitting and/or receiving the pilot signals.

14. The node of claim 13,
wherein the time-duplex configuration is indicative of at least two beams of the plurality of beams of each beam sweep for which the respective pilot signals are transmitted and/or received contemporaneously.

15. The node of claim 13,
wherein the control circuit is configured to time-synchronize the at least one beam sweep with the further node based on the time-duplex configuration.

16. A node of a network, comprising:
an interface for transmission on a wireless link of the network, and
a control circuit configured to determine a beam configuration of a beam used for transmission of data by the interface by: exchanging, with a further node of the network, a beam sweep configuration; controlling the interface to transmit and/or receive pilot signals in a plurality of beams of at least one beam sweep which is configured in accordance with the beam sweep configuration; and determining the beam configuration based on a receive property of the pilot signals,
wherein the beam sweep configuration is indicative of a time-per-beam for the plurality of beams of each beam sweep.

17. The node of claim 16,
wherein the beam sweep configuration is indicative of a frequency band allocated for the pilot signals on the wireless link.

18. The node of claim 16,
wherein the beam sweep configuration is indicative of directional characteristics of the at least one beam sweep, wherein the directional characteristics are optionally selected from the group comprising: a number of beams; a two-dimensional spatial arrangement of beams; a three-dimensional spatial arrangement of beams; a beam width of beams; a peak-to-peak opening angle of the at least one beam sweep; and a sweep sequence of beams.

19. The node of claim 16,
wherein the control circuit is configured to select the beam sweep configuration from a plurality of candidate beam sweep configurations exchanged with the further node.

20. The node of claim 16,
wherein the control circuit is configured to determine the beam sweep configuration based on at least one of a latency requirement of the transmission of the data and an energy consumption associated with the beam sweep.

21. A node of a network, comprising:
an interface for transmission on a wireless link of the network, and
a control circuit configured to determine a beam configuration of a beam used for transmission of data by the interface by: exchanging, with a further node of the network, a beam sweep configuration; controlling the interface to transmit and/or receive pilot signals in a plurality of beams of at least one beam sweep which is configured in accordance with the beam sweep configuration; and determining the beam configuration based on a receive property of the pilot signals,
wherein the control circuit is configured to repeatedly trigger said determining of the beam configuration based on at least one of a mobility of the node and a mobility of the further node.

22. The node of claim 21,
wherein the at least one beam sweep comprises a transmit beam sweep and/or a receive beam sweep,
wherein the pilot signals comprise uplink pilot signals and/or downlink pilot signals.

23. The node of claim 21,
wherein the control circuit is configured to negotiate the beam sweep configuration with the further node based on a beam sweep capability, the beam sweep capability comprising at least one of analog beamforming, digital beamforming, and hybrid beamforming.

* * * * *